H. L. GILLILAND.
WEEDING IMPLEMENT.
APPLICATION FILED JAN. 15, 1921.
1,400,673. Patented Dec. 20, 1921.
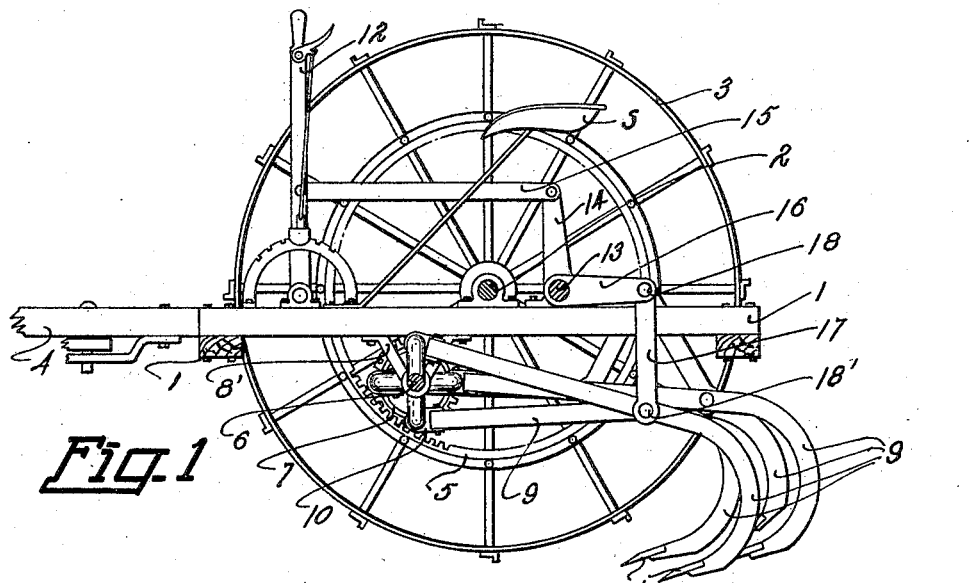
Fig. 1
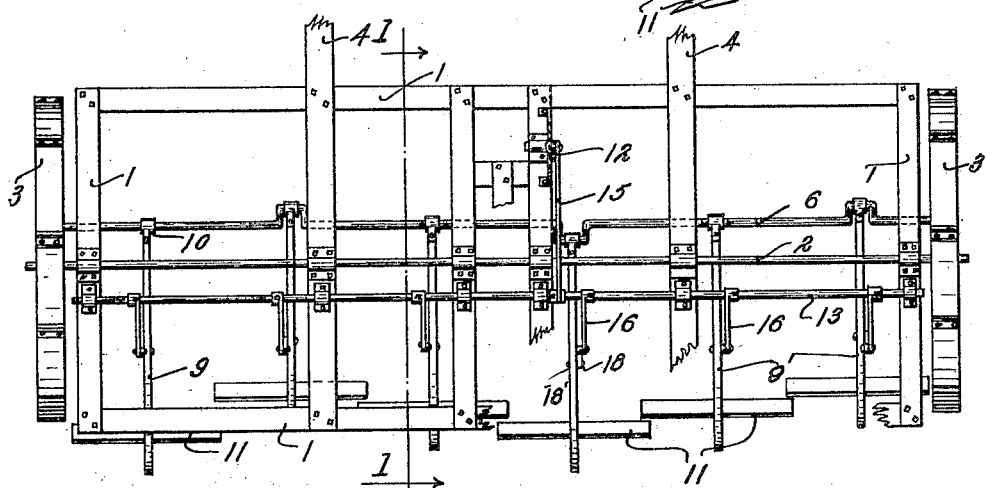
Fig. 2
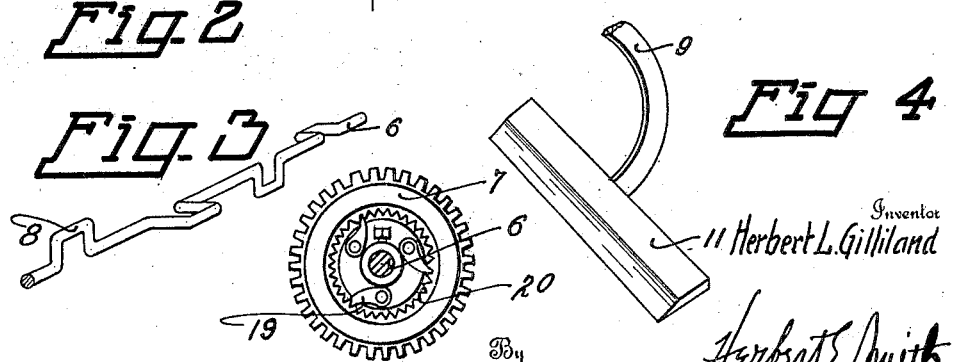
Fig. 3
Fig. 4
Fig. 5
Inventor
Herbert L. Gilliland
By Herbert E. Smith
Attorney

UNITED STATES PATENT OFFICE.

HERBERT L. GILLILAND, OF HARRINGTON, WASHINGTON.

WEEDING IMPLEMENT.

1,400,673.   Specification of Letters Patent.   Patented Dec. 20, 1921.

Application filed January 15, 1921. Serial No. 437,559.

*To all whom it may concern:*

Be it known that I, HERBERT L. GILLILAND, a citizen of the United States, residing at Harrington, in the county of Lincoln and State of Washington, have invented certain new and useful Improvements in Weeding Implements, of which the following is a specification.

My present invention relates to improvements in Weeding Implements involving the use of a plurality of oscillatable members similar to hoes, adapted to operate with their cutting or chopping edges slightly below the surface of the soil, in order to uproot and clear the soil of weeds, &c., in the process of cultivation of the ground for agricultural purposes.

With this end in view the primary object of the invention is the provision of an implement of this character that is comparatively inexpensive of production, simple in construction and operation and actuated by the traction wheels of the horse drawn implement by which the operating devices are carried.

By the utilization of my invention a comparatively wide area of ground is covered and weeded by the passage thereover of the weeding implement, and the weeding is accomplished with rapidity and effectiveness.

The invention consists in certain novel combinations and arrangements of parts whereby a series or plurality of independently acting hoe elements are simultaneously actuated by a common driving member, and other features of construction as will be hereinafter more fully described and claimed.

In the accompanying drawings I have illustrated one complete example of the physical embodiment in a wheeled-implement of the invention, wherein the parts are combined and arranged according to the best mode I have thus far devised for the practical application of the principles of my invention.

Figure 1 is a longitudinal sectional view of an implement embodying the invention, the section being taken at line 1—1 of Fig. 2.

Fig. 2 is a plan view of the implement with parts broken away for convenience of illustration.

Fig. 3 is a perspective view showing a portion of the crank shaft utilized for actuating the hoe members.

Fig. 4 is a perspective view of a portion of one of the hoe beams, showing also its blade or chopping device.

In the preferred form of the invention as illustrated in the drawings I have utilized a horse drawn implement involving a rectangular, tranversely extending supporting or main frame 1 in which the axle or shaft 2 is journaled, and the pair of traction wheels 3, 3 are fixed on the shaft to revolve therewith.

When horses are employed they may be attached to the draft tongues indicated at 4, which are rigidly attached to the frame as by bolts, or a tractor may be substituted for the horses and suitably connected with the implement if desired. Each of the traction wheels 3 is fashioned with an internal gear or toothed ring 5 rigidly attached thereto to impart rotary movement to a crank shaft 6 which is properly journaled, as at 8' beneath the supporting frame and extends parallel with the axle toward the front of the implement. At the respective ends of the crank shaft is located a fixed pinion 7 revoluble with the crank shaft and in engagement with the internal gearing to be driven thereby as the traction wheels revolve with passage of the implement over the soil.

The crank shaft is provided with a suitable number of arms or bearings 8 to which the several hoe beams 9 are connected by bearing collars 10, and each beam is equipped with a chopping blade 11. As shown in the plan view the blades are arranged to extend successively and transversely of the implement, at the rear of the axle, and about on a line with the rear edges of the traction wheels, and as the beams are of similar length but journaled at various points around the central axis of the crank shaft, the blades are located in staggered relation.

The blades are designed to enter just below the top surface of the soil, and they may be simultaneously adjusted as to altitude by operation of the lever 12 pivoted as usual on the frame, and in convenient position to be accessible to the driver who sits in the seat S. An oscillatable or rock bar 13 is journaled in the frame parallel with the crank shaft and to the rear of the axle and this bar may be actuated from the lever 12 by the connecting lever arm 14 and link 15. The rock bar has a number of fixed rock arms 16 corresponding to the number of hoe beams, and the hoe beams are suspended from the respective rock arms by links 17 pivoted at 18 and 18' to the arm and beam respectively.

In order to secure freedom of movement in turning, the wheels 3, 3 may be journaled on the ends of the axle, in which case the axle is fixed to the frame, and to provide for a differential movement of the driving gearing between the traction wheels and crank shaft, a pawl and ratchet mechanism, indicated at 19 and 20 in Fig. 5 in connection with the pinion 7, may be employed.

From the above description taken in connection with the drawings it will be apparent that as the implement is drawn over the ground the traction wheels operate the crank shaft through their gearing, and through the connections from the crank shaft the pivotally suspended hoe beams are actuated with a chopping action similar to the action of a hoe for digging into the soil of the field to clear the same of roots and weeds &c. To suit varying conditions the altitude of the hoe blades may be simultaneously varied by adjusting the lever 12, and the hoes may be elevated or lowered as required to secure proper entry of the edges of the blades 11 into the soil.

Having thus fully described the invention, what is claimed herein is—

The combination in an implement as described comprising a frame and traction wheels each having an internal gear ring, of a crank shaft and pinions thereon engaging said gear rings, a series of bent hoe beams journaled to the crank shaft and each provided with a transversely extending chopping blade, a rock bar, an operating lever, an arm on the rock bar and a link connecting said arm and lever, a series of rock arms on said bar corresponding with the hoe beams and a suspending link between each rock arm and its complementary hoe beam for the purpose described.

In testimony whereof I affix my signature.

HERBERT LESTER GILLILAND.